Patented Feb. 19, 1952

2,585,978

UNITED STATES PATENT OFFICE 2,585,978

METHOD OF STABILIZING RICE PRODUCTS

George R. Van Atta, Ernest B. Kester, and Harold S. Olcott, Berkeley, Calif., assignors to the United States of America as represented by the Secretary of Agriculture No Drawing. Application June 10, 1949, Serial No. 98,402

3 Claims. (Cl. 99—153)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the stabilization of rice and rice products. Objects of this invention include the provision of methods for treating rough rice to obtain stabilized products. Further objects will be apparent from the disclosure set forth herein.

In accordance with this invention, rough rice is subjected to a heated, moist gas in order to stabilize the oil content thereof. The heat-treated rice is then dried in a conventional manner. The resulting product may be hulled to obtain stabilized brown rice or it may be subjected to complete milling to obtain white rice and stabilized bran.

A problem that has plagued the rice industry for many years is the instability of the oil in the bran coating on rice, particularly after the hull has been removed. This oil develops fatty acids at a rapid rate and also rapidly becomes rancid in taste and odor. For this reason, brown rice (which is hulled rice consisting of the endosperm, the germ, and the bran layers) develops an unpleasant, rancid odor in a very short time, in a matter of weeks in the warmer climates. The instability of brown rice has therefore prevented the wide-spread use of this foodstuff despite the fact that it is more nutritious than white (polished) rice.

The instability of the oil in the bran layers is also a serious obstacle to the commercial production and utilization of rice bran oil. If the bran is removed from the rice in order to obtain the oil therefrom, the bran develops fatty acids and rancidity even more rapidly than if left on the rice. Further, the oil which can be recovered from the bran becomes progressively darker in color as the deterioration proceeds. The fatty acid content of the oil obtained from the bran has a drastic effect on the yield of refined oil which can be produced. This aspect can be explained as follows: After the oil is obtained from the bran by expression or by solvent extraction, it is treated with alkali to remove free fatty acids, suspended foreign materials, and coloring matter. In this refining process, the free fatty acids react with the alkali to form soap which, in the form of curds or flocs, is removed from the oil by settling. These soap curds entrap suspended matter, coloring matter and also some of the oil itself as they form and as they pass through the oil. These settlings, which contain soaps, foreign matter originally suspended in the oil, coloring matter, and neutral oil entrapped by the curds, are called foots or soap stock. These foots are of low value and their quantity represents the amount of crude oil lost in refining. The significant point is that the refining loss is not proportional to the content of free fatty acids but increases at a disproportionate rate as the free fatty acid content rises. This factor is so aggravated in the case of refining rice bran oil that a crude oil containing 5% free fatty acids will yield not more than 75 to 85% of the raw material as a neutral, edible oil. A crude oil of 7% free fatty acids would yield only about 60–65% of the raw material as a neutral, edible oil. If the content of free fatty acids is 10%, it would be impractical to refine the oil as the yield of neutral oil would be virtually negligible. Further the crude oil obtained from stored bran is so dark in color that the alkali refining process does not remove all this color and further this color in the refined oil cannot be removed by further processing. These factors—high refining loss and difficulty in producing an oil sufficiently pale in color to meet commercial requirements—have prevented the wide-spread utilization of rice bran as a source of neutral, edible oil.

Another point is that rice bran is potentially useful as a stock feed. However, it is not widely used for such purpose because it is unstable and rapidly becomes so malodorous that animals refuse to eat it.

The industry has long sought a suitable method for alleviating these problems but with no success. It has now been found that if the rice, in its undried, rough (paddy) state is blanched with heated, moist air (or other heated, moist gas), the oil in the bran layers is stabilized. By this treatment one obtains a stabilized brown rice or, if this material is milled, one obtains white rice and stabilized bran.

Thus according to this invention, one proceeds as follows: Freshly harvested rough rice, in its natural moisture condition, is subjected to heated, moist air (or other gas) for a short period of time. The blanched rough rice is then dried to a moisture content of about 10 to 15% to prevent spoilage by spontaneous heating and fermentation, then hulled. The resulting brown rice is stable and can be stored for months with little if any development of free fatty acids. If stabilized bran and white rice are desired, then the brown rice is subjected to a milling operation. The resulting stabilized bran can be stored for long periods before extraction of the oil and fatty acids will either not develop or at most appear very slowly. This stabilized bran can also be used as a feed as it remains palatable during storage.

It is to be emphasized that the instant process is entirely different from known processes in which rough rice is partially cooked in water, then dried and milled. In the known processes the partial cooking or parboiling process causes penetration of coloring matter from the bran layers into the endosperm. As a result the grain produce after milling has a yellow to brown color. Such products are not acceptable by a large proportion of rice consumers who demand a white rice. The important factor is that in our process the coloring matter remains in the bran layer and the kernal itself remains white. Thus in our process if the banched rough rice is hulled and milled, white rice is obtained together with the stabilized bran.

It is evident that the critical step in our process is the blanching with heated, moist gas. Although one may use nitrogen, carbon dioxide, or the like as the gas, we prefer to use air or steam as being the simplest and most economical media. Thus the rough rice may be treated with steam of with heated moist air. Heated moist air can be readily obtained by simply mixing steam and air. In general, temperatures from about 185° F. to about 212° F. are suitable. The time of blanching must be controlled so that treatment is effective to stabilize the oil in the bran layers yet the treatment is not drastic enough to cook nor to discolor the kernals nor to impair the milling quality of the rice. In general, the blanching time may be from about ½ minute to about 15 minutes. Particular temperatures and times of blanching will, of course, depend on the variety of rice, its condition, and type of product desired. The theory of the blanching operation is that it causes substantial inactivation of the lipase present in the bran. This enzyme is the cause of the development of fatty acids as it catalyzes the hydrolytic process whereby the glycerides are split into glycerol (or partially esterified glycerol) and free fatty acid. An expeditious method of controlling the time and temperature of blanching is to adjust these conditions so that the lipase activity is reduced to at least one-tenth of its original value while restricting the time and temperature of the treatment so that the rice is not cooked, nor the kernel discolored, nor the milling quality of the rice impaired.

The following examples set forth the process of this invention as applied to specific materials under specific conditions. It is understood that these examples are submitted only by way of illustration and not limitation.

Example I

A lot of undried rough rice (Japan variety) with a moisture content of 21.9% was divided into seven samples. Six of these samples were given a moist heat blanching treatment with steam-air mixtures or steam alone at various combinations of time and temperature. The blanched samples as well as the untreated sample (control) were dried to a moisture content of 13–14%, then hulled to obtain brown rice. Portions of the brown rice samples were analyzed for lipase activity. The brown rice samples were then stored at room temperature for periods of 2 to 8 weeks after which determinations were made of the increase in free fatty acid content of the oil over the original amount present (1.5%). The following results were obtained:

| Sample No. | Control | 1 | 2 | 3 | 4 | 5 | 6 |
| --- | --- | --- | --- | --- | --- | --- | --- |
| Blanching medium | | (1) | (1) | (1) | (1) | (2) | (2) |
| Blanching temperature, ° F | | 190 | 190 | 200 | 200 | 212 | 212 |
| Blanching time, minutes | | 5 | 15 | 5 | 15 | 5 | 15 |
| Lipase activity of bran, percent oil hydrolyzed [3] | 3.25 | 0.59 | 0.15 | 0.30 | 0.15 | 0.15 | 0.30 |
| 2 weeks storage of brown rice, increase in fatty acid content of oil, percent | 2.73 | 0.14 | 0.03 | 0.04 | —0.16 | 0.13 | 0.02 |
| 5 weeks storage of brown rice, increase in fatty acid content of oil, percent | 4.39 | 0.18 | 0.28 | 0.21 | 0.20 | 0.50 | 0.28 |
| 8 weeks storage of brown rice, increase in fatty acid content of oil, percent | 6.60 | 0.62 | 0.56 | 0.59 | 0.55 | 0.61 | 0.58 |

[1] Steam-air.
[2] Steam.
[3] Lipase activity was ascertained by extracting the oil from the bran with petroleum ether and shaking 200 mg. of the extracted bran with phosphate buffer (pH 7.2) and 1 gram of neutral glyceride oil for 16 hours at 37° C., then titrating with 0.1 N sodium hydroxide. The percentage of oil thus hydrolyzed is a measure of lipase activity.

The following example demonstrates that the process in accordance with this invention has another advantage in that it improves the milling quality of the rice. Thus when rough rice is subjected to a heated, moist gas and subsequently milled to obtain white rice, the proportion of white head rice (whole kernels of white rice) is greater than when the original rice is milled without the heat treatment.

Example II

A lot of undried rough rice with a moisture content of 22% was divided into three samples.

(A) One of these samples (control) was dried to a moisture content of 13.9% by subjecting it to air at 110° F. in three drying stages with intermediate tempering periods.

(B) The second sample was given a blanching treatment with steam at 212° F. for 1 minute. The blanched material was then dried to a moisture content of 14.5% by subjecting it to air at 110° F. in three drying stages with intermediate tempering periods.

(C) The third sample was given a blanching treatment with steam at 212° F. for 1 minute. The blanched material was then dried to a moisture content of 13.9% by subjecting it to air at 212° F. in five drying stages with intermediate tempering periods.

The three dried samples were each subjected to a standard milling test to determine the proportion of white head rice (whole kernels of white rice) which could be obtained from each sample. The following results were obtained.

| Sample | Total Rice, Per Cent [1] | White Head Rice, Per Cent |
|---|---|---|
| A (control) | 73.4 | 54.1 |
| B | 75.7 | 63.9 |
| C | 76.5 | 68.6 |

[1] White head rice plus broken kernels of white rice.

The blanching treatment may be carried out in many different types of apparatus. For example, one can use apparatus commonly used for blanching fruits or vegetables before freezing or canning. Thus the device may comprise an endless mesh conveyor belt which conveys the material past nozzles whereby steam or steam-air mixtures are applied to the material. The speed of the belt is adjusted so that the material receives the proper degree of blanching. Another expedient is to drop the material into a tower or chamber wherein it is subjected to a stream or streams of steam or steam-air mixtures. Such tower or chamber may be equipped with baffles or other agitating devices to provide good contact between the grain and the gas. Apparatus for drying, hulling, and milling are, of course, well known in the art and require no elaboration here. The step of drying is required as with any other similar product to prevent spoilage due to spontaneous heating, fermentation or microbial growth. In general during the drying temperatures much in excess of 110° F. should be avoided to prevent cracking and checking of the grain. As in present practice of drying rough rice this drying operation is preferably accomplished in steps involving removal of a limited percentage of moisture, followed by storage to equilibrate the moisture in the grain (tempering) and repetition of this process until the proper degree of dryness is obtained.

Having thus described our invention, we claim:

1. A process for preparing stabilized brown rice which comprises subjecting rough rice in an undried condition to heated, moist gas at a temperature of from about 185° F. to about 212° F. for a period of time of from about ½ minute to about 15 minutes to blanch the rice, thereby to substantially inactivate the lipase present in the rice without cooking the rice, discoloring the kernel, or impairing the milling quality of the rice, drying the blanched rough rice at a temperature not in excess of about 110° F. to a moisture content of from about 10% to about 15%, and hulling the blanched, dried rough rice.

2. A process for preparing stabilized brown rice which comprises subjecting rough rice in an undried condition to steam at a temperature of from about 185° F. to about 212° F. for a period of time of from about ½ minute to about 15 minutes to blanch the rice, thereby to substantially inactivate the lipase present in the rice without cooking the rice, discoloring the kernel, or impairing the milling quality of the rice, drying the blanched rough rice at a temperature not in excess of about 110° F. to a moisture content of from about 10% to about 15%, and hulling the blanched, dried rough rice.

3. A process for preparing white rice and stabilized bran which comprises subjecting rough rice in an undried condition to steam at a temperature of from about 185° F. to about 212° F. for a period of time of from about ½ minute to about 15 minutes to blanch the rough rice, drying the blanched rough rice at a temperature not in excess of about 110° F. to a moisture content of from about 10% to about 15%, and milling the dried, blanched rough rice thereby to obtain white rice and stabilized bran.

GEORGE R. VAN ATTA.
ERNEST B. KESTER.
HAROLD S. OLCOTT.

REFERENCES CITED

The following references are of record in the file of this patent:

UNITED STATES PATENTS

| Number | Name | Date |
|---|---|---|
| 117,271 | Fitts | July 25, 1871 |
| 1,423,830 | Christensen | July 25, 1922 |
| 1,662,401 | Sasseen | Mar. 13, 1923 |
| 1,850,123 | Anderson | Mar. 22, 1932 |

OTHER REFERENCES

Lundberg, The Harmel Institute, Pub. No. 20, Survey of Stabilization of Fats, Aug. 1947, TX-560-F 349 Science Library. Pp. 4 and 9.